(12) United States Patent
Oswald et al.

(10) Patent No.: US 7,704,315 B2
(45) Date of Patent: Apr. 27, 2010

(54) HIGHLY-FILLED, AQUEOUS METAL OXIDE DISPERSION

(75) Inventors: Monika Oswald, Hanau (DE); Corinna Kissner, Hanau (DE); Roland Weiss, Huettenberg (DE); Andreas Lauer, Kirchhain (DE)

(73) Assignee: Degussa AG, Duesseldorf (DE)

( * ) Notice: Subject to any disclaimer, the term of this patent is extended or adjusted under 35 U.S.C. 154(b) by 380 days.

(21) Appl. No.: 11/572,156

(22) PCT Filed: Jul. 19, 2005

(86) PCT No.: PCT/EP2005/007823

§ 371 (c)(1),
(2), (4) Date: Jan. 16, 2007

(87) PCT Pub. No.: WO2006/010523

PCT Pub. Date: Feb. 2, 2006

(65) Prior Publication Data

US 2008/0011441 A1    Jan. 17, 2008

(30) Foreign Application Priority Data

Jul. 28, 2004 (DE) .................... 10 2004 036 602

(51) Int. Cl.
C09C 1/36 (2006.01)
B22D 11/06 (2006.01)
C22C 1/05 (2006.01)
C22B 1/00 (2006.01)

(52) U.S. Cl. .................. 106/436; 164/1; 75/255; 75/746; 501/20; 501/54; 501/55; 501/80; 501/105; 501/126; 501/153; 264/4; 516/77; 516/78; 516/79; 516/90; 516/91; 516/92; 516/93; 516/94; 516/95; 516/96; 516/97

(58) Field of Classification Search .......... 164/1; 75/255, 746; 501/20, 54–55, 80, 84, 105, 501/126, 153; 264/4; 516/77–97
See application file for complete search history.

(56) References Cited

U.S. PATENT DOCUMENTS 5,567,353 A * 10/1996 Bogan, Jr. ............. 516/89
5,665,127 A * 9/1997 Moltgen et al. ............. 51/293
5,728,184 A * 3/1998 Monroe ................. 51/309
6,146,560 A * 11/2000 Behi et al. ............. 264/37.1
6,287,353 B1 * 9/2001 Celikkaya ............... 51/309
6,699,808 B1   3/2004 Schwertfeger et al.
2005/0014851 A1 * 1/2005 Bringley ................ 516/78

FOREIGN PATENT DOCUMENTS

GB    2 329 893    4/1999

OTHER PUBLICATIONS

Bhaskar V. Velamakanni, et al. "Effect of Interparticle Potentials and Sedimentation on Particle Packing Density of Bimodal Particle Distributions During Pressure Filtration", Journal of the American Ceramic Society, XP-002345226, vol. 74, No. 1, 1991, pp. 166-172.
Jose M.F. Ferreira, et al. "Drying-Induced Forming From Highly Concentrated Alumina Slips", Ceramic Processing Science VI, Ceramic Transactions, XP-009053909, vol. 112, 2001, pp. 483-488.
Jian-Lin Shi, et al. "Compaction and Sintering Behavior of Bimodal Alumina Powder Suspensions by Pressure Filtration", Journal of the American Ceramic Society, XP-000923793, vol. 83, No. 4, Apr. 2000, pp. 737-742.
Peter A. Smith, et al. "Effect of Particle Packing on the Filtration and Rheology Behavior of Extended Size Distribution Alumina Suspensions", Journal of the American Ceramic Society, XP-002345227, vol. 78, No. 7, 1995, pp. 1737-1744.

* cited by examiner

*Primary Examiner*—Anthony J Green
*Assistant Examiner*—Pegah Parvini
(74) *Attorney, Agent, or Firm*—Oblon, Spivak, McClelland, Maier & Neustadt, L.L.P.

(57) ABSTRACT

Aqueous dispersion containing a metal oxide powder with a fine fraction and a coarse fraction, in which—the metal oxide powder is silicon dioxide, aluminum oxide, titanium dioxide, zirconium dioxide, cerium oxide or a mixed oxide of two or more of the aforementioned metal oxides,—the fine fraction is present in aggregated form and has a mean aggregate diameter in the dispersion of less than 200 nm,—the coarse fraction consists of particles with a mean diameter of 1 to 20 μm, —the ratio of fine fraction to coarse fraction is 2:98 to 30:70, and—the content of metal oxide powder is 50 to 85 wt. %, referred to the total amount of the dispersion. The aqueous dispersion is produced by a process comprising the steps:— production of a fine fraction dispersion by dispersing the pulverulent fine fraction in water by means of an energy input of at least 200 KJ/m¿3?, and—introducing the coarse fraction in the form of a powder into the fine fraction dispersion under dispersing conditions at a low energy input. Process for the production of molded articles using the dispersion.

13 Claims, No Drawings

HIGHLY-FILLED, AQUEOUS METAL OXIDE DISPERSION

The present invention relates to a highly-filled, aqueous metal oxide dispersion and a process for its production. The invention also relates to a process for the production of a ceramic moulded article by means of the dispersion, as well as the ceramic moulded article itself.

The production of ceramic moulded articles starting from dispersions or according to sol-gel processes has been known for a long time. The disadvantage of the sol-gel process is that only low "green" densities can be obtained. Consequently, high shrinkage rates occur on drying and sintering. These process steps must be carried out very slowly, often over days and weeks, in order to avoid formation of cracks. The disadvantages can be reduced if the moulded article is obtained from a dispersion containing finely divided metal oxide particles. Although higher filler contents than in the sol-gel process reduce the shrinkage rates, nevertheless the filler content of such a dispersion is limited to ca. at most 60 wt. %.

In order to be able to obtain higher filler contents, a bimodal dispersion of silicon dioxide, aluminium oxide, silicon carbide or silicon nitride with a fine fraction of size less than 1 µm and a coarse fraction of size more than 1 µm in water is proposed in U.S. Pat. No. 6,193,926. A moulded article is obtained therefrom by adding a fluorine compound under shear conditions to the bimodal dispersion, which is obtained by incorporating the coarse fraction in a dispersion of the fine fraction, and the fluoride-containing bimodal dispersion is added to a mould and allowed to gel therein.

The disadvantage of this process is that a fluorine compound has to be an essential constituent of the dispersion in order to obtain a moulded article. Furthermore, U.S. Pat. No. 6,193,926 does not disclose what filler content the bimodal dispersion has. Simply the preferred filler content of the dispersion with the fine fraction is given. Also, the document does not disclose how the finely particulate dispersion is obtained and how the coarse fraction is added to the finely particulate dispersion.

It is furthermore known from DE-A-19943103 to produce amorphous silicon dioxide moulded articles from highly filled, bimodal dispersions. Such dispersions are produced by incorporating the fine fraction and coarse fraction in powder form under identical dispersion conditions into a pre-prepared dispersion agent. The fine fraction consists in this connection of particles with a grain size between 1 and 100 nm. It has now been found that it is not possible with the described process to obtain under identical dispersion conditions equally readily pourable dispersions over the specified grain size range. Accordingly the grain size of the powders does not appear to be the decisive factor for a pourable dispersion.

The object of the invention is a highly-filled metal oxide dispersion that is suitable for the production of ceramic moulded articles. In particular the dispersion should retain its pourability over a relatively long time and should provide ceramic moulded articles that exhibit only a slight shrinkage.

The present invention provides an aqueous dispersion containing a metal oxide powder with a fine fraction and a coarse fraction, in which the metal oxide powder is silicon dioxide, aluminium oxide, titanium dioxide, zirconium dioxide, cerium oxide or a mixed oxide of two or more of the aforementioned metal oxides, the fine fraction is present in aggregated form and has a mean aggregate diameter in the dispersion of less than 200 nm, the coarse fraction consists of particles with a mean diameter of 1 to 20 µm, the ratio of fine fraction to coarse fraction is 2:98 to 30:70, and the content of metal oxide powder is 50 to 85 wt. %, referred to the total amount of the dispersion.

The term aggregated is understood in this connection to mean the presence of primary particles that are sintered together. The mean aggregate diameter in the dispersion according to the invention may be determined for example by dynamic light scattering measurements. According to the invention it is less than 200 nm, values less than 100 nm being preferred.

The crystal structure and aggregate structure of the compounds used as coarse fraction is not restricted. Thus, the coarse fraction of the dispersion according to the invention may consist of spherical, needle-shaped or rod-shaped crystals, or may also exist in amorphous form.

The upper limit of the mean diameter of the coarse fraction particles may preferably be less than 10 µm and particularly preferably less than 5 µm.

In the case where the coarse fraction consists of aluminium oxide, it may be advantageous if the aluminium oxide is present in only slightly aggregated form. The term slightly aggregated means in this connection that individual particles have coalesced together, though the overwhelming proportion are present in the form of individual, non-aggregated particles. If the coarse fraction consists of mullite, then it may be advantageous if this is present in the form of needle-shaped crystals.

According to the invention the fine fraction and coarse fraction may consist of identical or different metal oxide components. Thus, it is possible for example to produce aluminium oxide ceramics in which both components are aluminium oxide. It is also possible that for example the fine fraction consists of aluminium oxide and the coarse fraction consists of silicon dioxide. In this way it is possible to obtain sintered moulded articles with a mullitic composition. The same result can also be obtained if the fine fraction has for example a silicon-aluminium mixed oxide structure and the coarse fraction is aluminium oxide and/or silicon dioxide or mullite powder.

Mixed oxide powders are understood to be powders in which there is an intimate mixing of the metal oxide components at the atomic level. The primary particles of these powders have M(I)-O-M(II) bonds, in which M(I) denotes the first metal component and M(II) denotes the second metal component. In addition regions of metal oxides without M(I)-O-M(II) bonds may also be present.

The fine fraction and coarse fraction may in each case comprise a multimodal distribution of the particle sizes. A dispersion that has a bimodal distribution of the particle sizes may be preferred for the production of moulded articles. It then should be understood by this that the fine fraction and coarse fraction in each case have a monomodal distribution in the dispersion. At the same time cases should also be covered in which the coarse fraction and fine fraction have a smaller proportion of coarser particles.

The BET surfaces of the fine fraction and coarse fraction are not restricted. The BET surface of the fine fraction of the dispersion according to the invention may preferably be 10 to 500 $m^2/g$, particularly preferably 50 to 200 $m^2/g$, and that of the coarse fraction may preferably be 0.1 to 10 $m^2/g$.

Preferably the fine fraction of the dispersion according to the invention may consist of a pyrogenically produced metal oxide powder.

The term pyrogenic is understood to mean flame-hydrolytic or flame-oxidative processes. In this connection metal oxide precursors are converted in the gaseous phase to the metal oxides in a flame produced by the reaction between hydrogen and oxygen. Highly dispersed, non-porous primary particles are first of all formed, which during the further course of the reaction coalesce to form aggregates, and these in turn can combine together to form agglomerates. The surfaces of these particles may have acidic or basic centres.

In the case where the coarse fraction of the dispersion according to the invention is aluminium oxide, it has proved advantageous if the content of α-aluminium oxide is at least 95%.

The dispersion according to the invention may furthermore contain up to 10 wt. % of pH-regulating additives such as acids, bases or salts and/or surfactant additives, such as for example polyacrylates. The choice of the additive is governed primarily according to the type of metal oxide in the dispersion and is known to the person skilled in the art. The addition of additives can stabilise the dispersion according to the invention against sedimentation and reduce the viscosity. On the other hand, the presence of additives may prove to be disadvantageous in the production of moulded articles. The presence of additives in the dispersion according to the invention is therefore preferably kept to a minimum.

The invention also provides a process for the production of the dispersion according to the invention, which process comprises the following steps:

production of a fine fraction dispersion by dispersing the pulverulent fine fraction by means of an energy input of at least 200 KJ/m$^3$ in water, which optionally contains a pH-regulating and/or surfactant additive, wherein the content of the fine fraction in the fine fraction dispersion is 30 to 60 wt. % adding the coarse fraction in the form of a powder into the fine fraction dispersion under dispersing conditions at a low energy input, in an amount such that the total content of fine fraction and coarse fraction is 50 to 85 wt. %.

Suitable dispersing equipment for the production of the fine fraction dispersion includes for example rotor-stator machines, such as the Ultra Turrax (IKA company), or those of the Ystral company, as well as ball mills, agitator ball mills, planetary kneaders or high-energy mills.

When using high-energy mills two pre-dispersed streams under high pressure are flashed through a nozzle. Both dispersion streams strike head on and the particles grind themselves against each other. In another embodiment the predispersion is likewise subjected to high pressure, though the collision of the particles takes place against armoured wall regions. The operation can be repeated as often as necessary in order to obtain smaller particle sizes.

It is essential that the introduction of the coarse fraction takes place under substantially lower energy inputs than is the case in the production of the fine fraction dispersion. A dissolver or toothed gear plate for example is suitable for this purpose.

If the introduction of the powder of the coarse fraction takes place under the same conditions that are used for the production of the fine fraction dispersion, there is a rapid rise in viscosity accompanied by gel formation.

Likewise, the introduction of the powder of the fine fraction into a coarse fraction dispersion under low energy input does not lead to the dispersion according to the invention. In this case a highly viscosity dispersion that tends to undergo gelling is obtained.

The invention also provides a process for the production of a moulded article having roughly its final contour, by a) transferring the aqueous dispersion according to claims 1 to 6 to a mould, optionally with a change in the pH value,
b) drying the moulded article,
c) removing the moulded article from the mould after solidification of the dispersion, in which the execution of the steps b) and c) may be interchanged.

Before transferring the dispersion to a mould, acids or bases may also be added to the dispersion according to the invention. As acids there may preferably be used HCl, HF, $H_3PO_4$ and/or $H_2SO_4$, and, as bases, $NH_3$, NaOH, tetramethylammonium hydroxide and/or KOH.

The transfer of the dispersion according to the invention to a mould may preferably take place by pouring. All moulds known to the person skilled in the art are in principle suitable as moulds. Suitable as materials are in principle all materials that are conventionally also used in ceramics. In this connection materials are preferred that exhibit a low adhesion for the dispersion, such as for example plastics, silicones, glass, silica glass or graphite.

Particularly preferred are polyethylene (PE), polypropylene (PP), polytetrafluoroethylene (PTFE), polyamide, silicone rubber and graphite. In addition coated materials such as for example metals coated with PTFE may also be used. The mould may also consist of a sheet or a sheet bubble. In principle any type of sheet may be used. Preferred are sheets of materials such as e.g. PE, PP, PET, PTFE, cellulose, cellulose hydrate, fibre fleece-reinforced cellulose or polyamide.

The invention also provides a moulded article having roughly its final contour that is obtainable by this process. A shrinkage of between 1 and 10% occurs on solidification of the dispersion to form a dimensionally stable moulded article.

EXAMPLES

Example 1

According to the Invention

Fine fraction dispersion: 36 kg of fully deionised water are placed in a 60 liter capacity stainless steel batch vessel. 16.5 kg of aluminium oxide, type C (DEGUSSA AG) are sucked in and coarsely pre-dispersed using a dispersion and suction mixer from the Ystral company (operating at 4500 rpm). During the suction process a pH of 4.5 is adjusted and maintained by adding 50% acetic acid. After the addition of the powder the dispersion procedure is completed with a rotor-stator throughflow homogeniser, type Z 66, from the Ystral company, with four processing rings, a stator slit width of 1 mm and a rotational speed of 11,500 rpm. During this 15-minute dispersion at 11,500 rpm the pH value is adjusted and held at a value of 4.5 by adding further 50% acetic acid. A total of 570 g of 50% acetic acid are required and a solids concentration of 30 wt. % is adjusted by adding 1.43 kg of water.

The mean aggregate size (median value) of the aluminium oxide particles in the dispersion is 87 nm.

Dispersion according to the invention: 1200 g of aluminium oxide powder, Nabalox® 625-31 (Nabeltec company) with a mean particle size of 1.68 μm and an α-aluminium oxide content of >95% are slowly worked into 500 g of the fine fraction dispersion with a dispersing device from the Getzmann® company with a toothed gear plate, operating at 1300 rpm.

The resultant dispersion has an aluminium oxide content of 79.4 wt. % and a pH of 5. It is pourable and is stable against sedimentation and gelling for a period of one month.

Example 2

According to the Invention

Fine fraction dispersion: First of all a dispersion is prepared similarly to Example 1, though using a pyrogenically produced aluminium oxide powder with a BET surface of ca. 65 m²/g. The amount of aluminium oxide powder is chosen so that the aluminium oxide content in the dispersion is 55 wt. %. This dispersion is ground with a high-pressure homogeniser, Ultimaizer System from Sugino Machine Ltd., Model HJP-25050, at a pressure of 250 MPa.

The mean aggregate size (median value) of the aluminium oxide particles in the dispersion is then 83 nm.

For the further processing the dispersion is adjusted with water to an aluminium oxide content of 40 wt. %.

Dispersion according to the invention: 930 g of aluminium oxide powder, Nabalox® 625-31 (Nabeltec company) with a mean particle size of 1.68 μm and an α-aluminium oxide content of >95 wt. % are slowly worked into 500 g of the fine fraction dispersion using a dispersing device from the Getzmann® company with a toothed gear plate, operating at 1300 rpm.

The resultant dispersion has an aluminium oxide content of 79 wt. % and a pH value of 5. It is pourable and is stable against sedimentation and gelling for a period of one month.

Example 3

Comparison Example 50 g of a pyrogenically aluminium oxide powder with a surface of 65 m²/g as fine fraction and 950 g of aluminium oxide powder, Nabalox® 625-31, were worked into a solution of 231.88 g of fully deionised water and 2 g of 25% tetramethylammonium hydroxide solution (TMAH) using a dispersing device from the Getzmann® company with a toothed gear plate, operating at 1300 rpm, and under the addition of a further 9.4 g of TMAH. The dispersion thickens within a few minutes.

Example 4

Comparison Example

An attempt was made to work 140 g of a pyrogenically produced aluminium oxide powder with a BET surface of 65 m²/g and 930 g of aluminium oxide powder, Nabalox® 625-31, into 200 g of water using a rotor-stator system at a rotational speed of 8000 rpm. A gel-like mass had formed even before the end of the aluminium oxide addition.

The dispersions according to the invention of Examples 1 and 2 are poured into moulds, dried at room temperature, and sintered at 1300° C. The moulded articles obtained are free from cracks.

The invention claimed is:

1. An aqueous dispersion comprising a metal oxide powder comprising a fine fraction and a coarse fraction, wherein
    the metal oxide powder is silicon dioxide, aluminum oxide, titanium dioxide, zirconium dioxide, cerium oxide or a mixed oxide of two or more of the said metal oxides,
    the fine fraction is present in aggregated form and has a mean aggregate diameter in the dispersion of less than 200 nm,
    the coarse fraction consists of particles with a mean diameter of 1 to 20 μm,
    a weight ratio of the fine fraction to the coarse fraction is 2:98 to 30:70, and
    a content of the metal oxide powder is 50 to 85 wt. %, referred to the total amount of the dispersion, and
    wherein (i) the fine fraction and the coarse fraction comprise different metal oxides, or (ii) if both the fine fraction and the coarse fraction comprise the same metal oxide, said metal oxide is at least one oxide selected from the group consisting of aluminum oxide, titanium dioxide, zirconium dioxide, and cerium oxide.

2. The aqueous dispersion according to claim 1, which is bimodal.

3. The aqueous dispersion according to claim 1, wherein the BET surface of the fine fraction is 10 to 500 m²/g and that of the coarse fraction is 0.1 to 10 m²/g.

4. The aqueous dispersion according to claim 1, wherein the fine fraction consists of a pyrogenically produced metal oxide powder.

5. An aqueous dispersion comprising a metal oxide powder comprising a fine fraction and a coarse fraction, wherein
    the metal oxide powder is silicon dioxide, aluminum oxide, titanium dioxide, zirconium dioxide, cerium oxide or a mixed oxide of two or more of the said metal oxides,
    the fine fraction is present in an aggregated form and has a mean aggregate diameter in the dispersion of less than 200 nm,
    the coarse fraction consists of particles with a mean diameter of 1 to 20 μm,
    a weight ratio of the fine fraction to the coarse fraction is 2:98 to 30:70, and
    a content of the metal oxide powder is 50 to 85 wt. %, referred to the total amount of the dispersion, and
    wherein the coarse fraction has a content of α-aluminum oxide of at least 95%.

6. The dispersion according to claim 1, wherein the dispersion comprises up to 10 wt. % of at least one pH-regulating additive and/or at least one surfactant additive.

7. A process for the production of the dispersion according to claim 1, comprising:
    producing a fine fraction dispersion by dispersing the pulverulent fine fraction with an input of energy in an amount of at least 200 KJ/m³ in water, which optionally contains a pH-regulating and/or surfactant additive, wherein the content of the fine fraction in the fine fraction dispersion is 30 to 60 wt. % and
    adding the coarse fraction in the form of a powder into the fine fraction dispersion under dispersing conditions at a low energy input, in an amount such that the total content of the fine fraction and the coarse fraction is 50 to 85 wt. %.

8. A process for the production of a molded article having its final contour by
    a) transferring the aqueous dispersion according to claim 1 to a mould, optionally with a change in the pH value,
    b) drying the molded article,
    c) removing the molded article from the mould after solidification of the dispersion,
    wherein the execution of b) and c) is optionally interchanged.

9. A molded article having its final contour, prepared by the process of claim 8.

10. The aqueous dispersion according to claim 5, which is bimodal.

11. The aqueous dispersion according to claim 5, wherein the BET surface of the fine fraction is 10 to 500 m$^2$/g and that of the coarse fraction is 0.1 to 10 m$^2$/g.

12. The aqueous dispersion according to claim 5, wherein the fine fraction consists of a pyrogenically produced metal oxide powder.

13. The as dispersion according to claim 5, wherein the dispersion comprises up to 10 wt. % of at least one pH-regulating additive and/or at least one surfactant additive.

* * * * *